(12) United States Patent
Kramer

(10) Patent No.: US 7,516,822 B2
(45) Date of Patent: Apr. 14, 2009

(54) SIMPLE ELECTRIC PARKING BRAKE ACTUATOR MOTOR

(75) Inventor: Dennis A. Kramer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 995 days.

(21) Appl. No.: 10/641,577

(22) Filed: Aug. 14, 2003

(65) Prior Publication Data
US 2005/0034939 A1 Feb. 17, 2005

(51) Int. Cl.
*F16D 65/34* (2006.01)
(52) U.S. Cl. .................................... 188/156; 188/162
(58) Field of Classification Search ................. 188/158, 188/160, 162, 171, 173, 71.9, 72.7–72.9, 188/2 D; 74/89.15, 424.8, 500.5, 512; 192/217.6, 192/219.4
See application file for complete search history.

(56) References Cited

U.S. PATENT DOCUMENTS

| | | | | |
|---|---|---|---|---|
| 3,790,225 A * | 2/1974 | Wehde | ..................... | 303/113.4 |
| 4,175,646 A * | 11/1979 | Eikelberger | ................. | 188/156 |
| 4,193,467 A * | 3/1980 | Simmons | ..................... | 180/271 |
| 4,202,430 A * | 5/1980 | Stevens | ........................ | 188/171 |
| 4,651,852 A * | 3/1987 | Wickham et al. | ............... | 477/4 |
| RE32,610 E * | 2/1988 | Washbourn et al. | ......... | 318/372 |
| 4,784,244 A * | 11/1988 | Carre et al. | .................. | 188/156 |
| 4,805,740 A * | 2/1989 | Wilke et al. | ................. | 188/173 |
| 4,865,165 A * | 9/1989 | Taig | ............................ | 188/156 |
| 4,941,553 A * | 7/1990 | Harrison | ...................... | 188/156 |
| 5,038,895 A * | 8/1991 | Evans | ......................... | 188/72.7 |
| 5,180,038 A * | 1/1993 | Arnold et al. | ............... | 188/171 |
| 5,586,623 A * | 12/1996 | Mery | ........................ | 188/72.6 |
| 5,704,693 A | 1/1998 | Mackiewicz | | |
| 5,769,189 A | 6/1998 | Heibel | | |
| 6,068,091 A * | 5/2000 | Finley | ...................... | 188/73.31 |
| 6,112,864 A * | 9/2000 | Suzuki et al. | ............... | 188/158 |
| 6,139,117 A * | 10/2000 | Shirai et al. | .................... | 303/3 |
| 6,247,381 B1 * | 6/2001 | Toelke et al. | .................. | 74/512 |
| 6,256,570 B1 | 7/2001 | Weiberle | | |
| 6,325,180 B1 * | 12/2001 | De Vries et al. | ........... | 188/72.1 |
| 6,505,714 B1 * | 1/2003 | Ward | .......................... | 188/72.1 |
| 6,662,909 B2 * | 12/2003 | Taniguchi | .................... | 188/162 |
| 6,860,570 B2 * | 3/2005 | Yanaka et al. | .................. | 303/20 |
| 2002/0092710 A1 * | 7/2002 | Oppitz et al. | .................. | 188/69 |

* cited by examiner

*Primary Examiner*—Christopher P Schwartz
(74) *Attorney, Agent, or Firm*—Carlson, Gaskey & Olds

(57) ABSTRACT

A simple parking brake includes an electric motor having an internally threaded nut. The internally threaded nut receives an externally threaded shaft. The shaft is pinned to a lever, such that it cannot rotate. The shaft thus moves linearly when the electric motor drives the nut to rotate. As the shaft moves, it drives the brake actuator between a parking position and a release position. A control supplies a pulse to drive the motor in the appropriate direction and for the particular appropriate distance. The pulse length is preferably selected to be longer than that necessary to move the shaft the necessary distance. The motor is preferably sized to stall once the desired park or open position is achieved. In this manner, a simple control is able to control the motor.

6 Claims, 1 Drawing Sheet

SIMPLE ELECTRIC PARKING BRAKE ACTUATOR MOTOR

BACKGROUND OF THE INVENTION

This application relates to an electric motor that drives a threaded shaft in a linear direction to move a parking brake between a park position and a release position.

Vehicles are provided with parking brakes powered by large springs. Air supplied to a chamber resists a spring force and holds the brake at a release position. When it is desired to move the brake to its park position, the air is released and the spring sets the brake. One common use of a parking brake is on a vehicle driveline. However, parking brakes are also associated with the vehicle wheels.

It would be desirable to provide a simple and low cost actuator for a vehicle parking brake.

SUMMARY OF THE INVENTION

In the disclosed embodiment of this invention, a simple electric stepper motor drives an internally threaded nut to in turn move a threaded shaft in a linear direction. The threaded shaft drives a lever to pivot and move a brake structure to set or release a parking brake. The electric motor is preferably provided with a control that drives the motor for a predetermined period of time. The motor is preferably sized such that it will stall once the brake has moved to an engaged or park position, rather than over-compressing any components.

Thus, a very simple actuator device and a very simple control are utilized to provide the parking brake function.

These and other features of the present invention can be best understood from the following specification and drawings, the following of which is a brief description.

DETAILED DESCRIPTION OF THE PREFERRED EMBODIMENT

Figure 1:
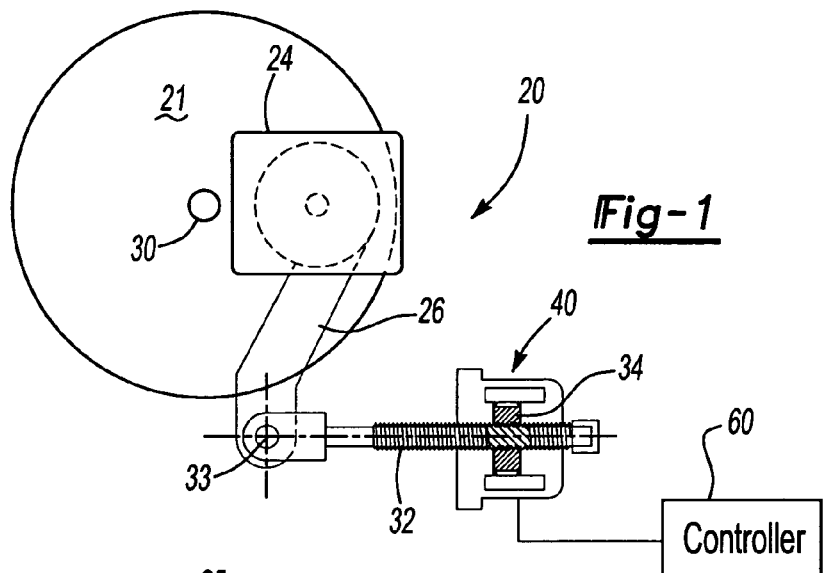
FIG. 1 is a schematic view of an inventive parking brake in a park position.
Figure 2:
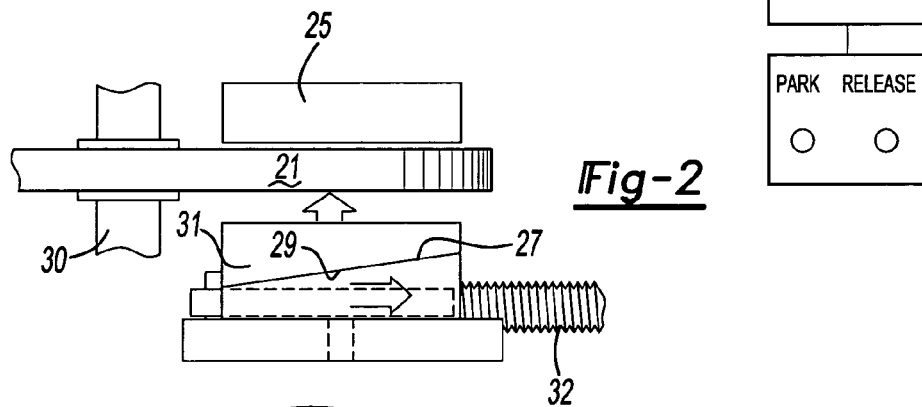
FIG. 2 shows a schematic detail of the brake surface.

A parking brake 20 is illustrated in FIG. 1 for locking a rotating disc 21 by a brake 24. As known, a lever 26 drives a cam surface 27 (as shown schematically in FIG. 2) along a surface 29 of a brake disc 31 to engage the disc 21 between an opposed disc 25. Disc 21 is preferably mounted along a driveline 30 (shown schematically). Lever 26 is connected to be driven to pivot under the influence of a threaded shaft 32.

Threaded shaft 32 is prevented from rotating by being fixed to the lever 26 such as by pin 33. The threaded shaft 32 is received within a threaded nut 34 on an electric motor 40. Electric motor 40 drives threaded nut 34 to rotate, and interaction between the threads on the nut 34 and the threads on the shaft 32 cause the threaded shaft to move to the left and the right as shown in FIG. 1.

Figure 3:
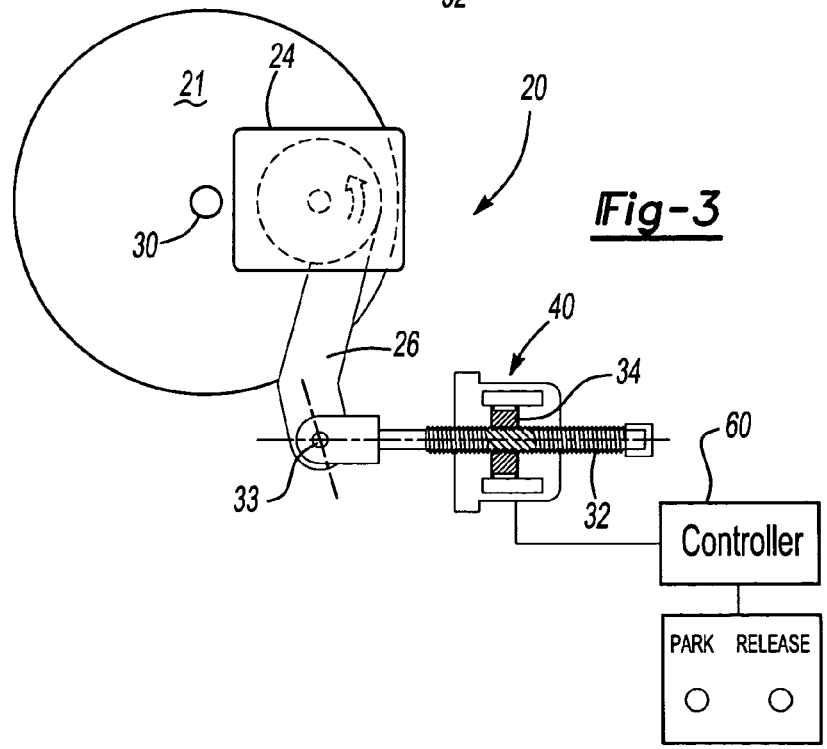
FIG. 3 is a schematic view of the inventive parking brake in its release position.

In the position shown in FIG. 1, the threaded shaft 32 is to its leftmost position. In this position, the brake is engaged, or in the park position. A control 60 for the motor includes a bridge driver and pulse timers. The driver has a park and release button. If the park button is engaged, a pulse time is sent to the motor tending to drive the motor in a direction to move the threaded shaft to the leftmost position such as shown in FIG. 1. Should the driver then engage the release button, another pulse may drive the motor in the reverse direction such that the threaded shaft can move to its rightmost position as shown in FIG. 3. In this position, the brake is released. Of course, the buttons could be any type of switch, such as a throw switch, a dial, a lever, etc.

A timed current pulse drives the motor in either direction, such that when the motor is driven, a timer integrated circuit controls the amount of drive time. The length of the pulse is preferably longer than the time required to drive the mechanism to either the full park or full release position. The motor is preferably sized to allow for a short stall condition at the end of each stroke. The motor is preferably a stepper motor, and may most preferably be a conventional, permanent magnet DC motor. The timer circuit may be a "555 timer IC", or a timer known generally as a mono stable multi-vibrator switch. A limit switch may be utilized to provide feedback to the driver of the position of the parking mechanism.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A parking brake for a vehicle comprising:
   an electric motor driven to rotate an internally threaded nut;
   a shaft having an external thread and received within said internally threaded nut, said shaft being constrained from rotating by being connected to an actuator member;
   said actuator member being connected to a brake mechanism such that said actuator member is movable between two extreme positions to in turn move said brake mechanism between a park position and a release position; and
   a control for driving said electric motor to rotate and cause said shaft to move, and in turn cause said actuator member to move said brake mechanism between said park and said release positions, said shaft driving a lever to pivot, said lever carrying a cam surface which cams a brake disc into engagement with a driveline structure to be locked to provide said park position;
   said control for sending a pulse to drive said electric motor in a particular direction to in turn move said shaft in an appropriate direction to move said brake mechanism between said park and said release positions; and
   said control for supplying a pulse length to said electric motor, said pulse length being longer than that necessary to move said shaft to drive said actuator member and move said brake mechanism between said park and said release positions.

2. The parking brake as set forth in claim 1, wherein said electric motor is a stepper motor.

3. A parking brake for a vehicle comprising:
   an electric motor driven to rotate an internally threaded nut;
   a shaft having an external thread and received within said internally threaded nut, said shaft being constrained from rotating by being connected to an actuator member;
   said actuator member being connected to a brake mechanism such that said actuator member is movable between two extreme positions to in turn move said brake mechanism between a park position and a release position;
   a control for driving said electric motor to rotate and cause said shaft to move, and in turn cause said actuator member to move said brake mechanism between said park and said release positions; and a timer for said control, said timer being a mono-stable, multi-vibrator switch.

4. The parking brake as set forth in claim 3, wherein said electric motor is a stepper motor.

5. A parking brake for a vehicle comprising:
an electric motor being driven to rotate an internally threaded nut;
a shaft having an external thread and received within said internally threaded nut, said shaft being constrained from rotating by being connected to a lever;
said lever being connected to a brake mechanism such that said lever is movable between two extreme positions to in turn move said brake mechanism between a park position and a release position, said lever carrying a cam surface which cams a brake disc for engagement with a driveline structure to be locked to provide said park position;
a control for driving said electric motor to rotate and cause said shaft to move, and in turn cause said lever to move said brake mechanism between said park and said release positions; and
said control being operable to send drive pulses to drive said electric motor, and move said shaft in an appropriate direction to move said brake mechanism between said park and said release positions, and said drive pulses being supplied over a length longer than that necessary to move said shaft to drive said lever and move said brake mechanism between said park and said release positions.

6. A parking brake for a vehicle comprising:
an electric motor driven to rotate one of an internally threaded nut and an externally threaded shaft, said internally threaded nut being received on said externally threaded shaft, the other of said internally threaded nut and said externally threaded shaft being constrained from rotating by being connected to an actuator member;
said actuator member being connected to a brake mechanism such that said actuator member is movable between two extreme positions to in turn move said brake mechanism between a park position and a release position; and
a control for driving said electric motor to rotate and cause said externally threaded shaft to move, and in turn cause said actuator member to move said brake mechanism between said park and said release positions, said control supplying a pulse length to said electric motor, said pulse length being longer than that necessary to move said externally threaded shaft to drive said actuator member and move said brake mechanism between said park and said release positions.

* * * * *